Sept. 12, 1961  C. W. PINKLEY  2,999,974
SIGNAL SWITCH AND READOUT FOR NUCLEAR MAGNETIC
RESONANCE MEASUREMENT APPARATUS
Filed July 5, 1960  3 Sheets-Sheet 1
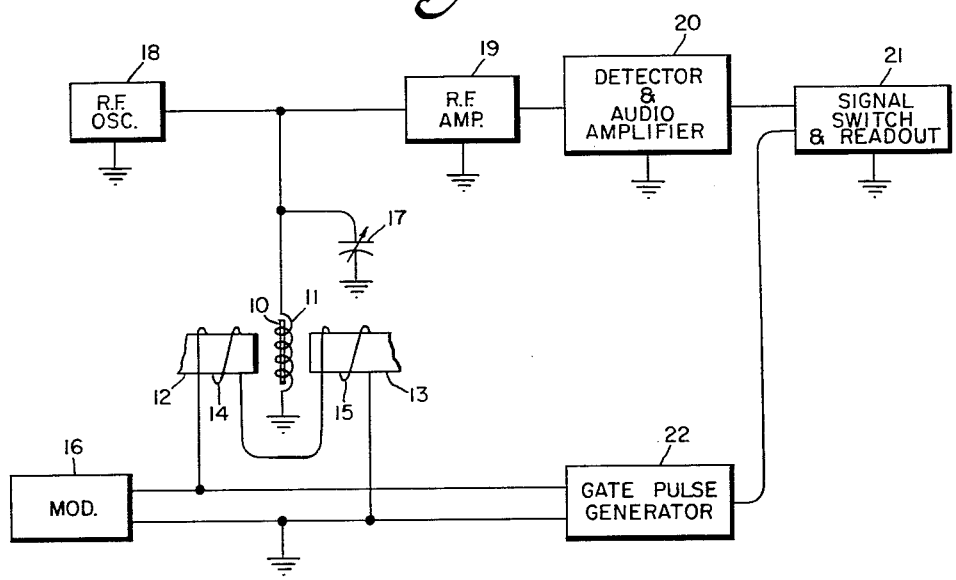
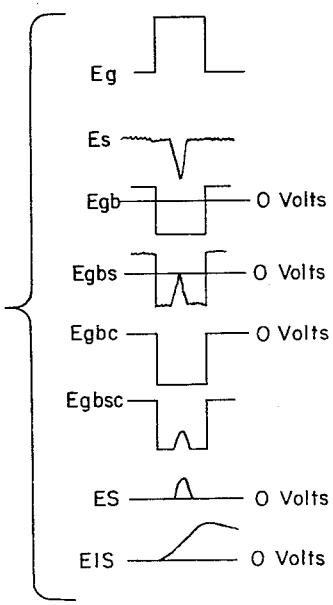
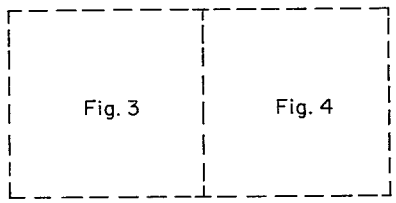
INVENTOR
Clyde W. Pinkley United States Patent Office 2,999,974
Patented Sept. 12, 1961

2,999,974
SIGNAL SWITCH AND READOUT FOR NUCLEAR MAGNETIC RESONANCE MEASUREMENT APPARATUS
Clyde W. Pinkley, Columbus, Ohio, assignor to Industrial Nucleonics Corporation, a corporation of Ohio
Filed July 5, 1960, Ser. No. 40,754
8 Claims. (Cl. 324—.5)

This invention relates to signal switch and readout apparatus, and in particular to the use of such apparatus for improving the signal-to-noise ratio of nuclear magnetic resonance devices by switching out the noise between successive signal pulses generated in response to the absorption phenomenon at resonance.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from a tank coil. When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different istotopes have different resonant frequencies.

The absorption phenomenon of nuclear magnetic resonance is also used to measure constituent proportions in various compounds. For example, moisture content measurements can be made in materials, such as tobacco or paper. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the radio-frequency field is perpendicular to the magnetic field, and the material to be measured is placed within the coil.

The radio-frequency field, or the magnetic field, is modulated at a slow audio rate. When the radio-frequency and the magnetic fields satisfy the relation $W = \gamma H$, where "W" is the angular velocity of the radio-frequency field, "H" is the permanent magnetic field strength in gauss, and "$\gamma$" is a constant dependent on the type of nucleus subjected to resonance, nuclear magnetic resonance occurs.

The resulting energy absorption causes a decrease in the impedance of the tank circuit, and therefore a decrease in the voltage appearing across the tank circuit. For a given set of conditions the magnitude of this change in voltage is proportional to the amount of absorbing substance present so that a quantitative measurement can be made.

For purposes of analysis, the voltage appearing across the tank circuit may be considered as an amplitude-modulated radio-frequency carrier. In order that the amplitude of this modulation can be used as a quantitative measurement of the substance under test, appropriate apparatus must be connected to the tank circuit. The apparatus includes amplifier and detector stages incorporating electronic components.

In the usual arrangement the modulated voltage across the tank circuit is applied to a radio-frequency amplifier tuned to the carrier frequency. The output of this amplifier is in turn applied to an audio detector so that the modulated carrier may be demodulated. The audio output of the detector is in turn amplified in an audio-amplifier and thereafter applied to a signal switch and readout circuit of this invention.

As may be readily appreciated, the amplitude of the modulation component occurring in response to nuclear absorption is relatively small and therefore the amplifiers and detectors are preferably designed so as to attain a high relative sensitivity. One of the factors limiting the sensitivity is the random noise generated by the vacuum tubes and other electrical components of the amplifiers and detectors. Sufficient material under test must therefore be excited to generate a signal greater than this noise level. A criterion for system performance is the ratio of the signal amplitude to the noise level.

A principal object of this invention is to provide apparatus which gives a substantial increase in the signal-to-noise ratio of nuclear magnetic resonance measuring devices, thereby increasing the sensitivity and the accuracy of the measurement.

Another object of the invention is to provide an improved signal switch and readout apparatus for switching out the noise between successive signal pulses generated in response to nuclear magnetic resonance absorption in a material under test.

Another object is to provide an improved electronic switch which has very low drift, no gate threshold, no signal base (that is, the switch will pass signals down to zero amplitude), and which will switch positive or negative signals from zero to 40 volts amplitude.

Another object is to provide an improved electronic switch which will maintain true pulse shape and which will also maintain meter zero independent of noise amplitude or system gain.

In order that all of the features for attaining the objects of this invention may be readily understood, reference is herein made to the drawings wherein:

FIG. 1 is a simplified block diagram of conventional nuclear magnetic resonance measuring and control apparatus as modified to incorporate the signal switch and readout apparatus of this invention.

FIG. 2 is a diagram of assistance showing the manner in which

Figure 3:
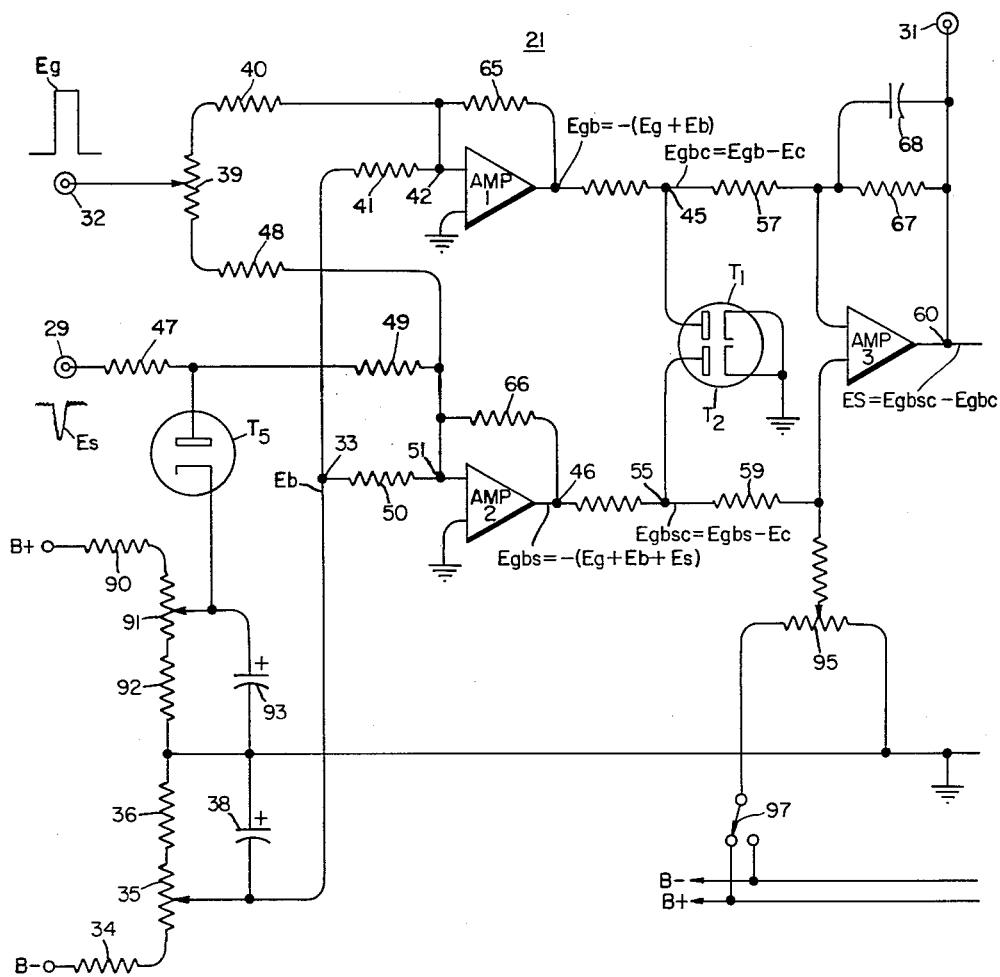
FIGS. 3 and 4 are combined to form a complete schematic circuit.
Figure 4:
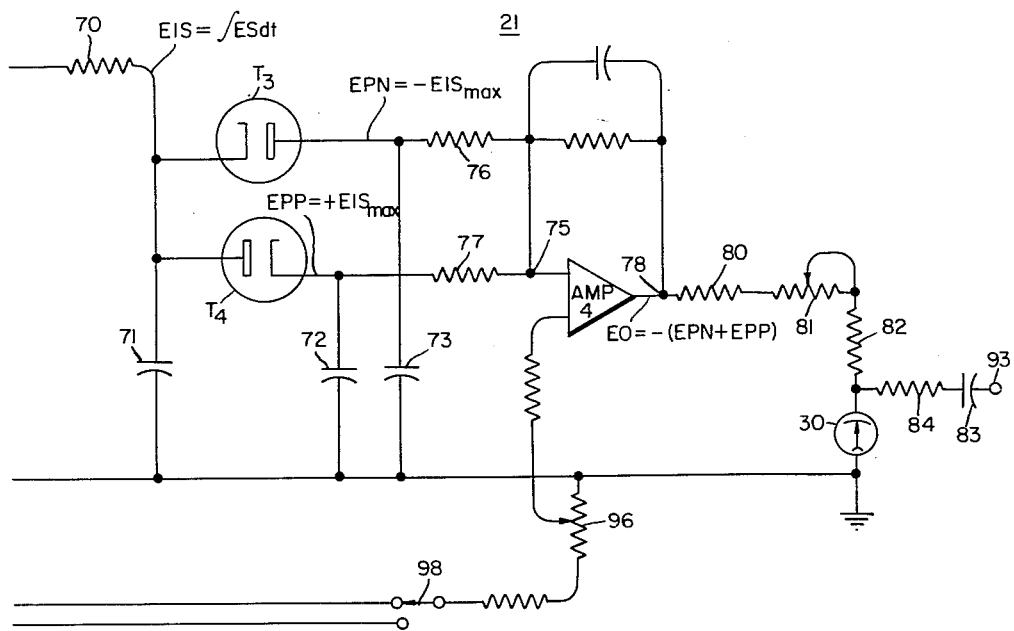

FIGS. 3 and 4, as combined, show a complete schematic circuit diagram of the signal switch and readout apparatus of this invention; and FIG. 5 is an associated group of waveforms showing the signals appearing at various points of the circuit of combined FIGS. 3 and 4.

Referring now to FIG. 1, material 10 under test is positioned in the center of radio-frequency sampling coil 11, and is thereby subjected to a radio-frequency field parallel to the longitudinal axis of coil 11. Material 10 is also subjected to a transverse magnetic field developed in the gap between permanent magnets 12 and 13. Modulation coils 14 and 15 envelop the pole ends of magnets 12 and 13, respectively, so that the otherwise steady magnetic field is amplitude modulated by the audio-frequency energy supplied from modulation source 16.

Capacitor 17 shunts coil 11 so that the combination 11—17 forms a parallel-resonant tank circuit connected to the output of constant-current radio-frequency oscillator 18. The tank circuit is tuned to the oscillator frequency and therefore a substantial radio-frequency voltage appears across the combination 11—17. This voltage has a constant amplitude except during those periodic instances at which the output frequency of oscillator 18 and the modulated magnetic field generated by magnets 12 and 13 and modulation coils 14 and 15 satisfy the requirements for nuclear resonance.

During resonance, material 10 absorbs energy from the radio-frequency field so as to periodically load coil 11. As is well known, the loading of a parallel tank circuit lowers the "Q" of the tank, thereby reducing the parallel impedance of the voltage appearing across the tank. The periodic absorption of energy by material 10 amplitude modulates the radio-frequency voltage appearing across tank circuit 11—17. The amplitude of this modulation component varies in accordance with the number of nuclei present to absorb energy from tank coil 11.

The voltage appearing across tank circuit 11—17 is applied to the input of radio-frequency amplifier 19. The signal output of radio-frequency amplifier 19 is in turn applied to the input of detector and audio frequency amplifier 20 which has an output connected to signal switch and readout means 21.

In a typical prior art installation, readout at 21 may be accomplished by an oscilloscope in which the vertical amplifier input terminals are connected to audio amplifier 20. The oscilloscope sweep is synchronized by an audio-frequency voltage generated by modulation source 16. This arrangement, therefore, produces a fixed pulse on the oscilloscope screen that varies in amplitude in accordance with the quantity of absorbing substance of the material 10 under test.

In the event the signal-to-noise ratio is exceedingly poor, difficulty can be encountered when one attempts to distinguish the absorption signal pulse from the random noise pulses. Accordingly, in the structure making up the signal switch and readout means 21 as described in detail hereinafter, an advantageous mode of operation is provided which switches out the noise between the adjacent absorption pulses. Accurate readout may then be accomplished on an oscilloscope or on a meter. In order to maintain the true pulse shape and also to maintain a zero meter reading independent of noise amplitude or system gain it is necessary to use a direct coupled switching amplifier to gate the resonance signals.

In general, signal switch and readout 21 is a direct coupled electronic switch which has a very low drift, no gate threshold, no signal base (that is, the switch will pass absorption pulse signals down to a zero amplitude) and which will switch positive or negative signals from zero to 40 volts amplitude. Gate pulse generator 22 generates a gate pulse which is used to switch signal switch 21 so that this latter unit will pass the desired absorption signals. The gate pulse used in effecting this switching is developed by a conventional timing section in which the 60 cycles per second field modulation voltage of the modulator 16 is phase shifted, amplified and used to trigger a monostable multivibrator. The monostable multivibrator output is used for the signal gate. The gate signal is phased (by a phase shift network included within pulse geneartor 22) to coincide with the absorption pulse train applied to the input of signal switch 21 from amplifier 20. The detail circuit arrangement for gate pulse generator 22 is not described herein for the reason that this structure is conventional and may be constructed in accordance with current knowledge and techniques.

Referring now to the detailed schematic of signal switch and readout device 21 appearing in combined FIGURES 3 and 4, this unit gates the absorption pulse train to eliminate the noise between successive pulses, and then integrates and filters the absorption pulses so that a direct-current signal output is developed at meter 30 proportional to the moisture content or other quality of the material 10 under measurement. In the event it is desired to apply the gated absorption pulse train to an oscilloscope or like device, a pulse signal output is obtained at output terminal 31 which may be applied directly to the vertical amplifier of the oscilloscope. The oscilloscope sweep voltage can be synchronized by the audio-frequency voltage generated from modulation source 16.

Signal switch and readout section 21 employs four amplifiers, AMP1, AMP2, AMP3, and AMP4. These amplifiers may be of conventional construction, or in the alternative if it is desired to use amplifier units commercially available, Philbrick Model K2S operational amplifiers may be employed with appropriate external terminal connections to perform the addition and subtraction functions hereinafter set forth.

Signal switch and readout 21 operates in the following manner. An electronic switching function and peak voltage indication are accomplished by the cooperative functions of AMP1, AMP2, AMP3, and AMP4. AMP1 is a summing amplifier in which a plus 130 volt, 1 millisecond gate pulse $Eg$ (generated in timing section 22 and in phase with an absorption pulse $Es$), is added to a bias voltage $Eb$ of approximately minus 40 volts, producing an output voltage $Egb$ at the output of AMP1. FIG. 5 shows the waveforms of the various voltages and signals referred to with reference to the circuit of combined FIGS. 3 and 4. The gate pulse $Eg$ is applied to unit 21 at input terminal 32. The bias voltage $Eb$ appearing at terminal 33 is developed in a voltage divider network comprising resistor 34, potentiometer 35, and resistor 36 connected between the B— supply terminal and ground. The amplitude of the bias voltage can be selected by manual adjustment of potentiometer 35. Pulsations in the bias voltage $Eb$ are filtered by capacitor 38.

Potentiometer 39 and resistors 40 and 41 comprise a summing network connected to the input terminal 42 of summing amplifier AMP1. The amplitude of the gate pulse $Eg$ applied to input terminal 32 can be altered by manual adjustment of potentiometer 39.

The output voltage $Egb$ of AMP1 is clipped at zero volts by diode T1 producing the voltage $Egbc$ at terminal 45 which is a negative squarewave.

AMP2 is also a summing amplifier in which the gate pulse $Eg$ is added to the bias voltage $Eb$, and also to the absorption signal pulse $Es$ applied to terminal 29, producing an output voltage $Egbs$ at the output of AMP2 appearing at terminal 46. Potentiometer 39 and resistors 47, 48, 49 and 50 comprise a summing network connected to input terminal 51 of AMP2. Absorption signal $Es$ is applied to amplifier input terminal 51 through resistors 47 and 49. Gate pulse $Eg$ is applied to input terminal 51 through the lower tapped portion of potentiometer 39 and resistor 48. Bias voltage $Eb$ is applied to input terminal 51 through resistor 50.

The output voltage $Egbs$ of AMP2 is clipped at zero volts by diode T2 producing a negative squarewave $Egbsc$ at terminal 55 having the absorption pulse $Es$ superimposed on its negative portion as is shown in the $Egbsc$ curve of FIG. 5.

The squarewave $Egbc$ is applied to input terminal 56 of subtraction amplifier AMP3 through resistor 57. The squarewave $Egbsc$ is applied to the input terminal 58 of subtraction amplifier AMP3 through resistor 59. The squarewaves $Egbc$ and $Egbsc$ are subtracted in amplifier 3 producing an output voltage ES at terminal 60 which is the gated absorption pulse $Es$ with a no gate threshold. Accordingly, the noise occurring between successive absorption pulses $Es$ has been eliminated with a corresponding improvement in the signal-to-noise ratio.

Resistor 65 connected to terminals of AMP1, resistor 66 connected to terminals of AMP2, and resistor 67 and capacitor 68 connected to terminals of AMP3 constitute appropriate external connections to the aforementioned Philbrick amplifier unit so that the required addition and subtraction functions may be accomplished. It should be understood, however, that other types of conventional and well known addition and subtraction amplifiers may be employed to perform the functions of AMP1, AMP2 and AMP3.

The structure comprising AMP1, AMP2, AMP3 and their associated components, including clipping tubes T1 and T2, constitute the signal switch of this invention. In the event that pulse ES is desired as an output, appropriate readout equipment, such as an oscilloscope, may be connected to output terminal 31. In certain applications, a readout signal in the form of an output voltage proportional to the moisture content or other characteristic of the material under measurement is desired. Diodes T3 and T4 and amplifier AMP4 provide such an output at meter 30.

In particular, integration of the pulse train ES is accomplished with an RC circuit including resistor 70 and capacitor 71 having a time constant of 20 milliseconds and producing the voltage EIS across capacitor 71. The peak voltage across capacitor 71 is read out with the peak reading circuit comprising diodes T3 and T4 and capacitors 72 and 73. The negative peaks are read out as a voltage EPN appearing across capacitor 73, and positive peaks are read out as voltage EPP appearing across capacitor 72.

Voltage EPN is applied to input terminal 75 of addition amplifier AMP4 through resistor 76, and voltage EPP is applied to input terminal 75 through resistor 77. These voltages are added in summing amplifier AMP4 producing an output voltage EO which, in turn, produces a proportion current in the microammeter 30 which may be situated on the front panel of a cabinet housing the apparatus of this invention. Output voltage EO appearing at output terminal 78 is applied to meter 30 through a circuit including resistor 80, sensitivity adjustment potentiometer 81, and resistor 82. An alternating current having a linear, small amplitude is applied to meter 30 to prevent sticking of the meter needle through a circuit which includes terminal 99, capacitor 83 and resistor 84.

Both the positive peak EPP and the negative voltage peak EPN of the integrated signal EIS are employed to maintain a zero reading in meter 30 in the absence of a sample under test, as the average value of noise during any particular gated period may be either positive or negative due to low frequency components. In addition, dual peak readout increases the filtering accomplished without decreasing the response time appreciably.

It should also be noted that the signal switch and readout section is a direct coupled system. Integration is carried out using zero volts as the base. An A.C. coupled system would lead to errors in readout since the pulse train, which is a periodic function, would shift about this base as the pulse amplitude and width changed. In a RC coupling circuit, the output voltage across the resistor of this coupling circuit would have a zero average value. Therefore, integration of a pulse in an RC coupled circuit would always be zero. Clamping of the pulse train to a base of zero is impractical because some of the energy of the pulse train would be lost in development of the clamping voltage.

Diode T5 and its associated components 90, 91, 92 and 93 are connected across the input terminal 29 for absorption signal pulse $Es$. This circuit subcombination operates in conjunction with amplifiers AMP1 and AMP2 so that the adjustment of the bias on diode T5 by means of potentiometer 91 and the bias on amplifiers AMP1 and AMP2 by means of potentiometer 35 makes it possible to adjust the positive and negative cutoff voltages so they are equal (approximately 40 volts) with assurance that very little noise appears on the output meter 30.

The bias on AMP3 is adjusted with potentiometer 95 so that for $Egbc$ equals $Egbsc$ equals zero, the output voltage ES will be zero.

Potentiometer 96 is a meter zero potentiometer, which may be advantageously located on the front panel of the instrument. Switches 97 and 98 permit changing of the bias voltage polarity in the event this is necessary on replacement of amplifiers AMP3 and AMP4.

It should be understood that the above described arrangements are illustrative of the principles of this invention, and that modifications can be made without departing from the scope of this invention.

What is claimed is:

1. In nuclear magnetic resonance apparatus for subjecting a material to be analyzed to mutually perpendicular magnetic and radio-frequency fields including a resonant tank circuit and amplifier circuitry to develop an absorption signal pulse train in response to a condition of nuclear resonance between the fields and for the material being measured, improved signal switch apparatus comprising a gate pulse generator developing a gate pulse train coincident with the signal pulse train, a bias voltage source, a first amplifier adding the gate pulse train and the bias voltage, a second amplifier adding the signal pulse train, gate pulse train and the bias voltage, a clipping circuit clipping the voltages added by the first amplifier, a second clipping circuit clipping the voltages added by the second amplifier, and a subtraction amplifier subtracting the added voltages of one of the adding amplifiers from the added voltages of the other adding amplifier, thereby developing an output signal pulse train with a substantially reduced noise level between output signal pulses.

2. In nuclear magnetic resonance apparatus for subjecting a material to be analyzed to mutually perpendicular magnetic and radio-frequency fields including a resonant tank circuit and amplifier circuitry to develop an absorption signal pulse train in response to a condition of nuclear resonance between the fields and for the material being measured, improved signal switch apparatus comprising a gate pulse generator developing a gate pulse train of squarewaves coincident with the signal pulse train, a bias voltage source, a first amplifier adding the gate pulse train and the bias voltage, a second amplifier adding the signal pulse train, gate pulse train and the bias voltage with each signal pulse being superimposed upon a gate pulse to reduce the combined voltage, a clipping circuit clipping the voltages added by the first amplifier, a second clipping circuit clipping the voltages added by the second amplifier at the same clipping voltage as that of the first clipping circuit, and a subtraction amplifier subtracting the clipped added voltages of one of the adding amplifiers from the clipped added voltages of the other adding amplifier, thereby developing an output signal pulse train with a substantially reduced noise level between output signal pulses.

3. An improved electronic switch for a signal pulse train comprising a gate pulse generator developing a gate pulse train coincident with the signal pulse train, a bias voltage source, a first amplifier adding the gate pulse train and the bias voltage, a second amplifier adding the signal pulse train, gate pulse train and the bias voltage, a clipping circuit clipping the voltages added by the first amplifier, a second clipping circuit clipping the voltages added by the second amplifier, and a subtraction amplifier subtracting the clipped added voltages of one of the adding amplifiers from the clipped added voltages of the other amplifier, thereby developing an output signal pulse train with a substantially reduced noise level between output signal pulses.

4. An improved electronic switch comprising a gate pulse generator developing a gate pulse train of squarewaves coincident with the signal pulse train, a bias voltage source, means adding the gate pulse train and the bias voltage, means adding the signal pulse train, gate pulse train and the bias voltage with each signal pulse being superimposed on a gate pulse to reduce the combined voltage, means clipping the voltage added by the first means and the voltage added by the second means at the same voltage level, and means subtracting one of the clipped voltages from the other clipped voltage, thereby developing an output signal pulse train with a substantially reduced noise level between output signal pulses.

5. In nuclear magnetic resonance apparatus for subjecting a material to be analyzed to mutually perpendicular magnetic and radio-frequency fields including a resonant tank circuit and amplifier circuitry to develop an absorption signal pulse train in response to a condition of nuclear resonance between the fields and for the material being measured, improved signal switch and readout apparatus comprising a gate pulse generator developing a gate pulse train coincident with the signal pulse train, a bias voltage source, a first amplifier adding the gate pulse train and the bias voltage, a second amplifier adding the signal pulse train, gate pulse train and the bias voltage, a clipping circuit clipping the voltages added by the first amplifier, a second clipping circuit clipping the voltages added by the second amplifier, and a subtraction amplifier subtracting the added voltages of one of the adding amplifiers from the added voltages of the other adding amplifier, thereby developing an output signal pulse train with a substantially reduced noise level between output signal pulses, an integrating circuit directly coupled to the subtraction amplifier and integrating the output signal pulse train, an output amplifier adding positive and negative voltage peaks of the integrated signal, and a readout device responsive to the proportional output current of the output amplifier.

6. In nuclear magnetic resonance apparatus for subjecting a material to be analyzed to mutually perpendicular magnetic and radio-frequency fields including a resonant tank circuit and amplifier circuitry to develop an absorption signal pulse train in response to a condition of nuclear resonance between the fields and for the material being measured, improved signal switch apparatus comprising a gate pulse generator developing a gate pulse train of squarewaves coincident with the signal pulse train, a bias voltage source, a first amplifier adding the gate pulse train and the bias voltage, a second amplifier adding the signal pulse train, gate pulse train and the bias voltage with each signal pulse being superimposed upon a gate pulse to reduce the combined voltage, a clipping circuit clipping the voltages added by the first amplifier, a second clipping circuit clipping the voltages added by the second amplifier at the same clipping voltage as that of the first clipping circuit, and a subtraction amplifier subtracting the clipped added voltages of one of the adding amplifiers from the clipped added voltages of the other adding amplifier, thereby developing an output signal pulse train with a substantially reduced noise level between output signal pulses, an integrating circuit directly coupled to the subtraction amplifier and integrating the output signal pulse train, an output amplifier adding positive and negative voltage peaks of the integrated signal, and a readout meter responsive to the proportional output current of the output amplifier.

7. An improved electronic switch and readout for a signal pulse train comprising a gate pulse generator developing a gate pulse train coincident with the signal pulse train, a bias voltage source, a first amplifier adding the gate pulse train and the bias voltage, a second amplifier adding the signal pulse train, gate pulse train and the bias voltage, a clipping circuit clipping the voltages added by the first amplifier, a second clipping circuit clipping the voltages added by the second amplifier, and a subtraction amplifier subtracting the clipped added voltages of one of the adding amplifiers from the clipped added voltages of the other amplifier, thereby developing an output signal pulse train with a substantially reduced noise level between output signal pulses, an integrating circuit directly coupled to the subtraction amplifier and integrating the output signal pulse train, means developing separate positive and negative peak voltages responsive to the integrated signal, and an output amplifier adding the positive and negative peak voltages.

8. An improved electronic and readout switch for a signal pulse train comprising a gate pulse generator developing a gate pulse train of squarewaves coincident with the signal pulse train, a bias voltage source, means adding the gate pulse train and the bias voltage, means adding the signal pulse train, gate pulse train and the bias voltage with each signal pulse being superimposed on a gate pulse to reduce the combined voltage, means clipping the voltage added by the first means and the voltage added by the second means at the same voltage level, and means subtracting one of the clipped voltages from the other clipped voltage, thereby developing an output signal pulse train with a substantially reduced noise level between output signal pulses, an integrating circuit directly coupled to the subtraction amplifier and integrating the output signal pulse train, means developing separate positive and negative peak voltages responsive to the integrated signal, and an output amplifier adding the positive and negative peak voltages.

References Cited in the file of this patent
UNITED STATES PATENTS

| | | |
|---|---|---|
| 2,714,663 | Norton | Aug. 2, 1955 |
| 2,888,638 | Nelson | May 26, 1959 |